United States Patent [19]

Watters

[11] Patent Number: 5,084,224

[45] Date of Patent: Jan. 28, 1992

[54] METHOD FOR MAKING HEARING AID VENT PASSAGE

[75] Inventor: Velma Watters, Carlisle, Canada

[73] Assignee: Unitron Industries Ltd., Kitchener, Canada

[21] Appl. No.: 602,597

[22] Filed: Oct. 24, 1990

[30] Foreign Application Priority Data

Apr. 25, 1990 [CA] Canada .................................. 2015400

[51] Int. Cl.$^5$ .............................................. B29C 35/12
[52] U.S. Cl. .................................... 264/155; 264/156;
264/267; 264/DIG. 46
[58] Field of Search ................. 264/267, 27, DIG. 30,
264/222, 227, DIG. 46, 155, 156

[56] References Cited

U.S. PATENT DOCUMENTS

| | | | |
|---|---|---|---|
| 3,263,268 | 8/1966 | Flaherty | 264/27 |
| 3,922,415 | 11/1975 | Dexter | 264/27 |
| 4,569,812 | 2/1986 | Werwath et al. | 264/255 |
| 4,586,624 | 5/1986 | Shaw | 264/27 |
| 4,652,414 | 3/1987 | Schaegel | 264/DIG. 30 |

Primary Examiner—Jan H. Silbaugh
Assistant Examiner—Brian J. Eastley
Attorney, Agent, or Firm—Bereskin & Parr

[57] ABSTRACT

A method for producing a vent passage for an in-the-ear hearing aid shell. One or more vent holes are drilled in the shell, and a vent tubing having a copper core is laid against the shell interior wall extending through the vent holes. Electricity is passed through the core to heat the vent tubing rapidly (e.g. within 15 seconds) to 60° C. Simultaneously with the heating, acrylic monomer and polymer are mixed. The mixture is poured promptly into the shell over the tubing, and excess mixture is then poured out, after which the coating on the tubing is cured and the tubing is removed. The rapid heating causes onset of polymerization adjacent the tubing but not elsewhere, so that a very compact vent passage is formed with minimal labor and little excess acrylic polymerization in unwanted areas. The heating is performed using a fixture having clamping plates mounted on a rod. A timer causes clamping of the plates to hold the ends of the core and passes electricity through the core for a timed period, after which the clamping pressure is released.

9 Claims, 3 Drawing Sheets

METHOD FOR MAKING HEARING AID VENT PASSAGE

FIELD OF THE INVENTION

This invention relates to a new method for producing vents in hearing aids.

BACKGROUND OF THE INVENTION

In hearing aids which fit into the user's ear, it is necessary to provide a vent from one end of the hearing aid to the other to relieve pressure which could otherwise build up in the ear canal behind the hearing aid. One method of producing such vents is shown in U.S. Pat. No. 4,569,812 issued Feb. 11, 1986 and assigned to Beltone Electronics Corporation. In that method a preliminary shell is formed and then tubing is placed within the preliminary shell. Then, additional liquid molding material is poured into the preliminary shell to form a final shell having a thick wall which covers the tubing. The tubing is then removed, producing a vent in the space which it formerly occupied.

Another and somewhat simpler method of producing a vent, which has been used by hearing aid manufacturers since at least 1982, has been to mold a conventional in-the-ear hearing aid shell of acrylic material and then to lay a piece of tubing against the interior wall of the shell. Acrylic molding material (the same as that from which the shell was made) is then brushed onto the tubing and is then cured. The tubing is then removed leaving a vent where the tubing was located.

A difficulty with both of the above methods is that interior space within the shell is extremely limited (since the shell must fit within the user's ear), and yet sufficient space is needed to house the hearing aid components, including the receiver, electronics, battery and controls. In both methods described above, a significant amount of space was occupied by the additional wall structure within the shell required to form the vent. In addition, both methods are highly labour intensive and costly.

SUMMARY OF THE INVENTION

It is therefore an object of the invention to provide a method of producing a vent in a hearing aid shell in which the interior space occupied by the wall defining the vent is reduced and in which the time required to produce the vent is also reduced.

In one aspect the invention provides a method for producing a vent passage extending through the cavity of a hearing aid shell, said cavity being defined by an interior wall of said shell and said vent passage being defined by a vent wall overlying said interior wall, said method comprising:

(a) producing one or more vent holes in said shell, (b) laying an elongated flexible core member against said interior wall of said shell and extending through said hole or holes along the path of the desired core passage, said vent member having a conductive portion extending along its length, (c) passing an electric current through said core member to rapidly heat said core member, (d) mixing a small quantity of a pourable heat settable material and depositing such mixture in a quantity greater than that needed to form said vent wall, onto said core member substantially immediately after said core member has been heated, so that the heated core member causes the onset of setting a thin layer of said mixture adjacent said core member and so that said mixture deposited away from said heated core member does not set, (e) pouring out the excess mixture from said shell quickly after depositing said mixture on said core member, (f) curing the mixture remaining on said core member, and (g) removing said core member, so that the cured mixture forms a vent wall.

Further objects and advantages will appear from the following description and drawings.

DETAILED DESCRIPTION OF PREFERRED EMBODIMENT

Figure 1:
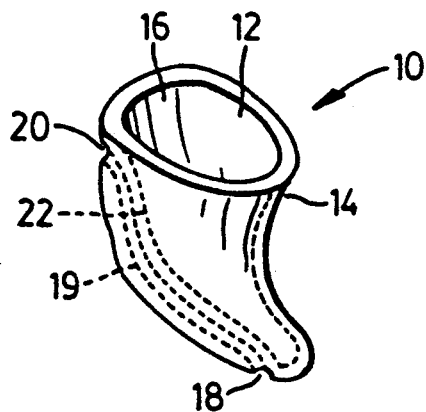
FIG. 1 is a diagrammatic perspective view of an in-the-ear hearing aid shell with a vent passage formed therein.

Reference is first made to FIG. 1, which shows a conventional in-the-ear hearing aid shell 10 having an inner cavity 12 defined by a wall 14. The open end 16 of the cavity 12 is adapted to be closed by a conventional faceplate (not shown).

Figure 2:
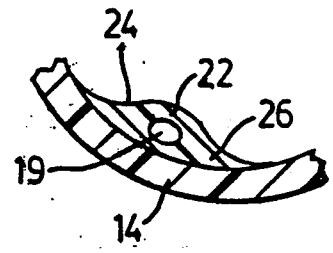
FIG. 2 is a cross-sectional view of a portion of a shell of the kind shown in FIG. 1, showing a vent passage formed according to past practice.

The shell 10 has a vent hole 18 at its tip. Vent hole 18 is connected by a passage 19 to a vent hole 20 adjacent the open end 16 of the shell. (In some hearing aids the vent hole 20 is omitted and is replaced by a corresponding vent in the faceplate which will cover open end 16.) The passage 19 extends through a thickened wall area 22 (see FIG. 2) of the shell 10.

The shell 10 is normally formed from an acrylic monomer/polymer. Typically the monomer used is methyl methacrylate and the polymer is pigmented plasticized polymethyl methacrylate, both supplied by Esschem of Essington, Pa., U.S.A.

Traditionally the vent passage 19 is formed by drilling holes 18 and 20 and inserting a vent tubing through the vent holes, which tubing projects through the vent holes. Using a dental tool the operator then presses the tubing against the interior shell wall to make the resultant vent as small and flat as possible, to allow maximum space for the interior components.

The operator then mixes refrigerated acrylic polymer and acrylic monomer, de-aerates the mixture under vacuum, and then brushes the mixed material on over the vent tubing using a fine brush. A hair dryer is used to provide hot air heat to the material, to help it set and thicken, so that the operator can build up the layers which he/she is depositing to an appropriate thickness for the vent wall. Typically the operator works on about five hearing aids at the same time, so that the material on one hearing aid can set while the operator is brushing acrylic material onto the others. When the vent walls have been built up to the necessary thickness, the shells are placed in a hot water bath to cure the acrylic.

After the shells are removed from the hot water bath, they are allowed to cool slightly and the vent tubing is then pulled out, leaving the vent passage 19. The operator then, using power smoothing tools, removes excess acrylic from the shell interior and also removes excess acrylic projecting from the holes 18, 20. The result of the operation is the vent wall 22 shown in FIG. 2.

There are numerous difficulties with the current method described above. Firstly, the operation is both labour intensive and time consuming and is therefore expensive.

Secondly, the repeated deposits of acrylic material necessary to build up the layers usually result in deposit of at least some acrylic in unwanted places. The excess acrylic must be ground away, and this often results in damage to the shell interior. Frequently shells must be thrown away when this occurs.

Thirdly, there is no way of controlling "flowout" from brushing the acrylic material onto the vent tubing. The result is that the acrylic material added always extends laterally well beyond the required vent passage, as indicated at 24 and 26 in FIG. 2. The additional material occupies a significant amount of space which could otherwise be used for hearing aid components.

Fourthly, it is difficult, when brushing acrylic material in a very small space, to achieve uniform acrylic placement, thickness, and removal of excess. It is also difficult to assure void-free walls, particularly in difficult to reach areas, and particularly because the shape of the shell may vary from one shell to another (depending on the characteristics of the user's ear).

Figure 3:
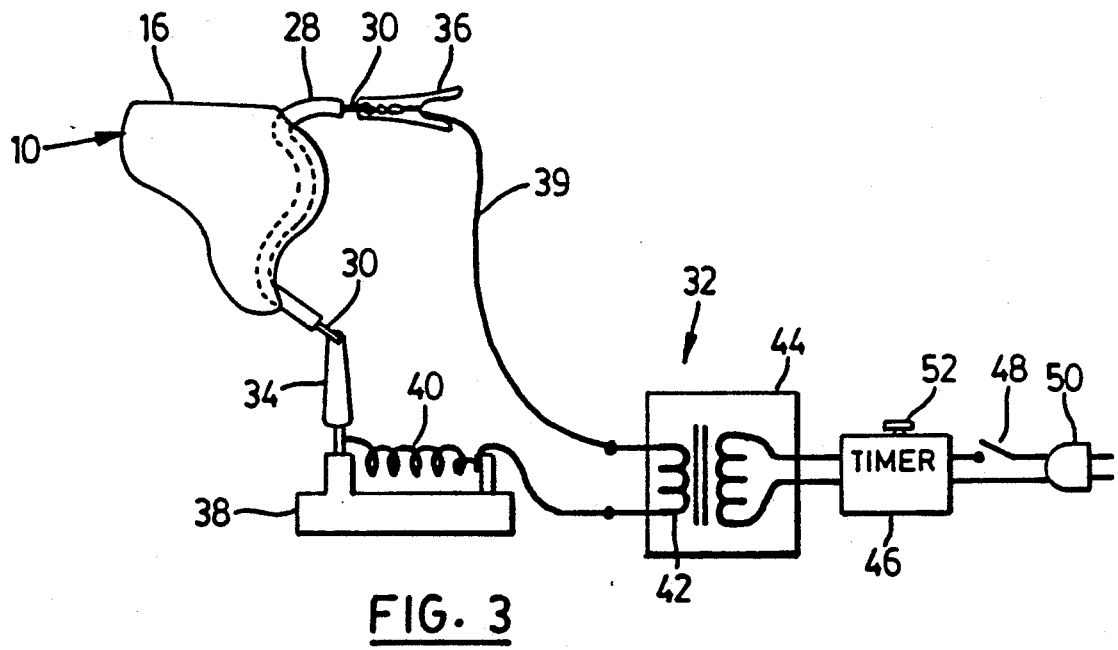
FIG. 3 is a diagrammatic view showing apparatus used to perform the method of the invention.

The method according to the invention will now be described with reference to FIGS. 3 and 4. In this method the operator determines the appropriate size for the vent holes 18, 20. The operator then, as before, drills the shell to produce these holes and inserts vent tubing as before. The vent tubing is shown at 28 in FIG. 3.

As before the vent tubing 28 has a silicon coated outer wall to prevent acrylic adherence when the tubing is removed. However the vent tubing 28 now used has a copper core 30 for conduction of electricity. An electric energy source 32 is connected to the core to heat the core. The energy source 32 is designed to provide very rapid heating of the vent tubing 28, e.g. from room temperature (about 20° C.) to between 60° C. and 70° C. (preferably 60° C.) in about 14 to 16 seconds. The primary purpose of the rapid heating is not simply to enable efficient production, although that is of course an advantage. Rather, the primary purpose of having the heating rapid is to minimize the amount of heat transfer to adjoining parts of the shell and thus to reduce heating of adjoining parts of the shell.

While the vent tube 28 is being heated, the operator mixes (typically) 2 grams of acrylic polymer and 2 mls of acrylic monomer. After about 15 seconds the mixing operation should be complete and the vent tubing should have reached the desired temperature (e.g. 60° C. to 70° C.). The mixture is then poured quickly onto the vent tubing 28 within the shell 10 and is then poured out again within a very short time, typically three to seven seconds. The localized heating provided by the vent tubing 28 causes the onset of polymerization of the acrylic at the site of the vent tubing. However polymerization does not occur elsewhere in the shell because there has been little or no heat transfer to the rest of the shell.

Immediately after the mixture of polymer and monomer is poured out of the shell, the shell 10 is immersed in a hot water bath to fully cure the acrylic. Less time is required for this immersion than in the conventional process, since the acrylic is so thin. On removal from the hot water bath the shell is allowed to cool slightly, and then the vent tubing is removed as in the traditional method. There is normally no need to grind the interior of the shell to remove excess acrylic, because normally there will be no excess polymerized acrylic deposited with the present method. In addition, there is usually only minor touch-up or no touch-up, required at the vent holes 18, 20 because, since the operation is conducted so quickly and because the vent tubing is very warm, little acrylic can flow through the small space between the tubing 28 and these holes.

To enable quick disconnection of the vent tubing 28 from the energy source 32 (so that excess acrylic can be poured out of the shell 10), the core 30 of the tubing 28 is typically connected to the energy source 32 by alligator clips 34, 36. One clip 34 is fixedly connected in an upwardly pointing orientation to a stand 38, so that the shell 10 is supported with its faceplate opening 20 facing generally upwardly, ready to receive the poured acrylic mixture. The other clip 36 is connected to a flexible wire 39 connected to the energy source 32. Wire 39 has very low stiffness and clip 36 is very light, to reduce the likelihood that the vent tubing 28 will be pulled away from its position tight against the interior wall of shell 10.

Energy source 32 is shown diagrammatically as having a resistor 40 connected to the low voltage secondary winding 42 of a transformer 44. Wire 39 is also connected to winding 42. The transformer 44 is connected through a timer 46 and power switch 48 to a plug 50 which is connected to an appropriate power source. The timer 46 is controlled by a knob 52 to set the exact heating time desired.

Figure 4:
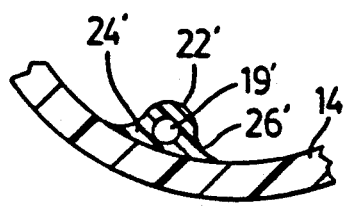
FIG. 4 is a cross-sectional view of a hearing aid shell of the kind shown in FIG. 1 but showing a vent formed according to the method of the present invention.

FIG. 4 shows the vent passage wall 22' typically produced by the method of the invention. The flow-out areas 24', 26' have been greatly reduced in size and the wall 22' itself has been made thinner, so that less space is occupied by the vent passage.

It will be seen that the method of the invention allows the production of a quality vent passage in a very short time, with much less labour than previously. The vent passage wall occupies minimal interior space, typically leaves the shell interior blemish-free, and has a non-obtrusive appearance. In fact it is found that it is difficult to detect, sometimes even under a microscope, where the old and new material meet with the present invention. Although the vent wall is very thin, the function of the vent is simply to carry pressure waves and not load forces and therefore it is found adequate for the small hearing aids in which it is used.

Figure 5:
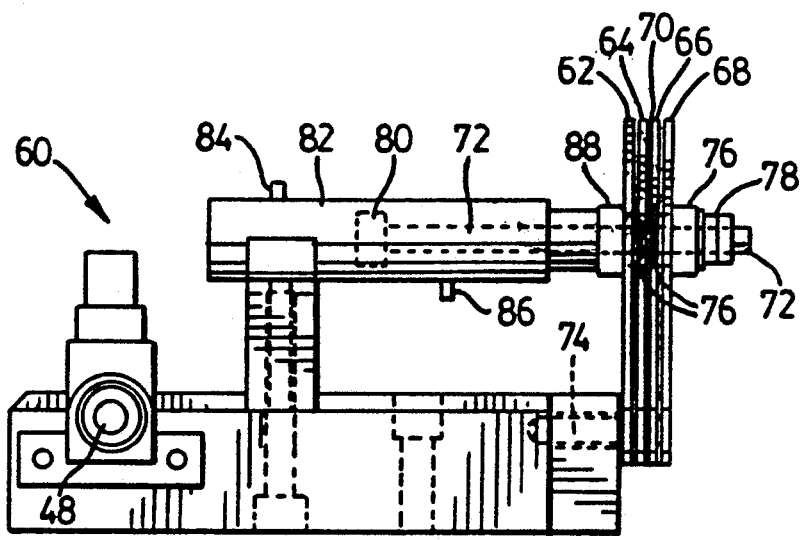
FIG. 5 is a side view of a fixture used to clamp and apply power to the core of a vent tube according to the invention.
Figure 6:
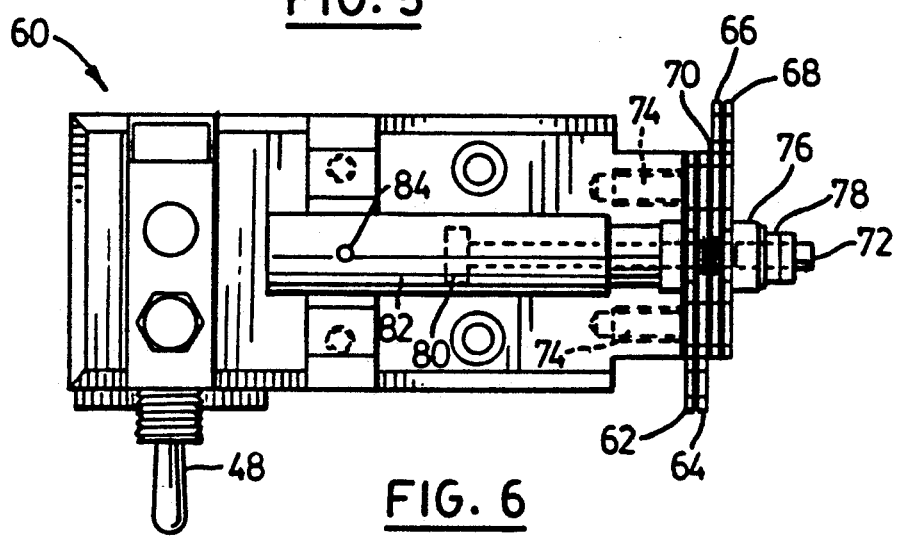
FIG. 6 is a top view of the FIG. 5 fixture.
Figure 7:
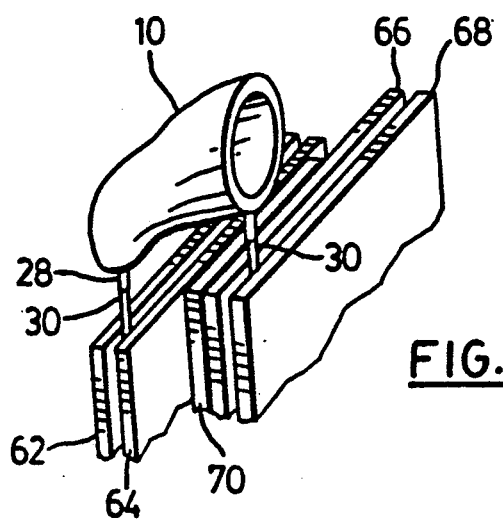
FIG. 7 is a perspective view of part of the FIG. 5 fixture with a hearing aid shell in place therein.

FIGS. 5, 6 and 7 show a device 60 for more conveniently heating the vent tube 28. The device 60 has four conductive plates 62, 64, 66, 68 and an insulating plate 70 separating plates 64, 66. All five plates are loosely mounted on a central rod 72 and are also guided by guide pins 74. Thin springy washers 76 normally urge plates 62, 64 slightly apart from each other and also normally urge plates 66, 68 slightly apart from each other. The central rod 72 and guide pins 74 are all sheathed with insulating material so they do not make electric contact with plates 62 to 68.

At least one of plates 62, 64 is connected to one side of transformer 44, and at least one of plates 66, 68 is connected to the other side of transformer 44.

The free end of rod 72 is connected to an insulating bushing 76 by a nut 78, while the other end of rod 72 is connected to a piston 80 in an air cylinder 82. Air can enter or leave cylinder 82 through ports 84, 86.

Figure 8:
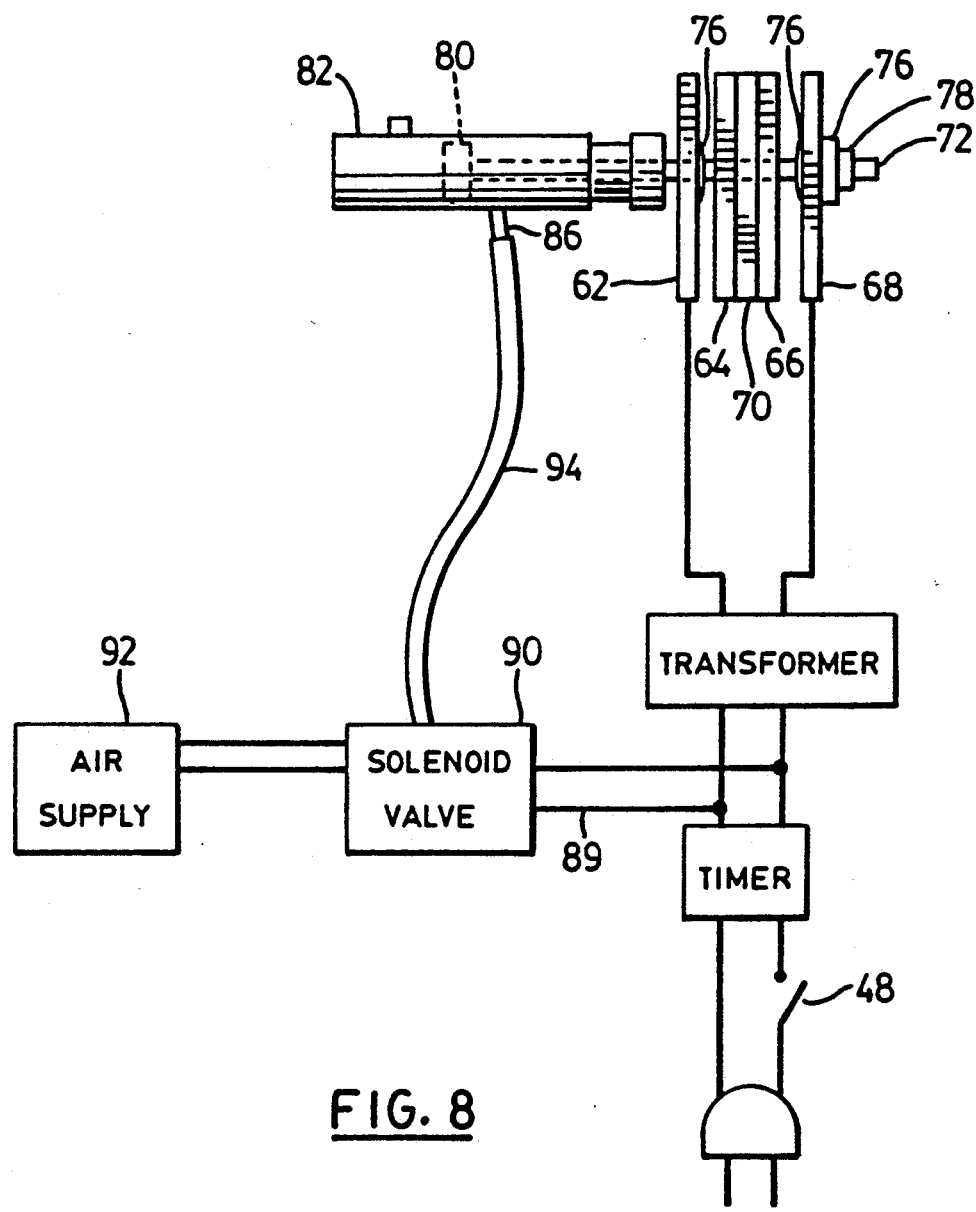
FIG. 8 is a diagrammatic view of a control circuit for the FIG. 5 fixture.

In use, piston 80 can be actuated to clamp plates 62 to 70 together by pulling them against insulated bushing 88, as shown in FIGS. 5 and 6, or to relieve the clamping pressure. When clamping pressure is relieved, the washers 76 will separate plates 62, 64 from each other and will also separate plates 66, 68 from each other, as shown in FIG. 7. As shown in FIG. 8, piston 80 is actuated when power switch 48 is turned on, operating timer 46. Connections 89 from timer 46 operate a solenoid valve 90 which allows pressurized air from an air supply 92 to pass through tube 90 to air inlet 86.

In use, the ends of the copper core 30 are inserted into the gaps between plates 62, 64, and 66, 68 respectively. Then, power switch 48 is operated. This starts timer 46, actuating piston 80 to clamp the ends of core 30 and at the same time directing power into the core 30 from transformer 44. After e.g. 15 seconds, timer 46 times out, disconnecting power from plates 62, 68 (and hence from core 30) and also releasing the clamp constituted by plates 62 to 70. The operator then removes the shell and pours in acrylic as previously described.

If desired, plates 64, 66, 70 can be replaced by a single insulated plate since plates 62, 68 will still apply power to core 30.

I claim:

1. A method for producing a vent passage extending through the cavity of a hearing aid shell, said cavity being defined by an interior wall of said shell and said vent passage being defined by a vent wall overlying said interior wall, said method comprising:
    (a) producing one or more vent holes in said shell,
    (b) laying an elongated flexible core member against said interior wall of said shell and extending through said hole or holes along the path of the desired vent passage, said core member having a conductive portion extending along its length,
    (c) passing an electric current through said core member to rapidly heat said core member thereby minimizing heat transfer to adjoining parts of the shell and thus reducing heating thereof,
    (d) mixing a small quantity of a pourable heat settable material and depositing such mixture, in a quantity greater than that needed to form said vent wall, onto said core member substantially immediately after said core member has been heated, so that the heated core member causes the onset of setting of a thin layer of said mixture adjacent said core member and so that said mixture deposited away from said heated core member does not set because there has been little or no heat transfer to adjoining parts of the shell,
    (e) pouring out the excess mixture from said shell quickly after depositing said mixture on said core member,
    (f) curing the mixture remaining on said core member, and
    (g) removing said core member, so that the cured mixture forms said vent wall.

2. A method according to claim 1 wherein said mixture is a mixture of a monomer and a polymer.

3. A method according to claim 1 wherein said mixture is a mixture of an acrylic monomer and an acrylic polymer.

4. A method according to claim 1, 2, or 3 wherein said mixture is deposited on said core member by pouring said mixture onto said core member.

5. A method according to claim 1, 2 or 3 wherein said conductive portion is a conductive core and said core member includes an insulating sheath around said conductive core.

6. A method according to claim 1, 2 or 3 wherein said core member is heated to between 60° C. and 70° C.

7. A method according to claim 1, 2 or 3 wherein said core member is heated to about 60° C.

8. A method according to claim 1, 2 and 3 wherein said core member is connected to a source of electricity by at least one quick connect/disconnect clamp to allow rapid disconnection of said shell from said source for prompt pouring out of excess mixture within said shell.

9. A method according to claim 1, 2 or 3 and including the steps of simultaneously clamping the ends of said conductive core and passing electricity through said conductive core for an automatically timed interval.

* * * * *